May 9, 1961 J. H. ANDRESEN, JR 2,983,211
CABIN PRESSURIZATION-PRESSURE MONITOR SYSTEM
Filed March 19, 1957 3 Sheets-Sheet 1

INVENTOR.
JOHN H. ANDRESEN, JR.
BY
ATTORNEYS

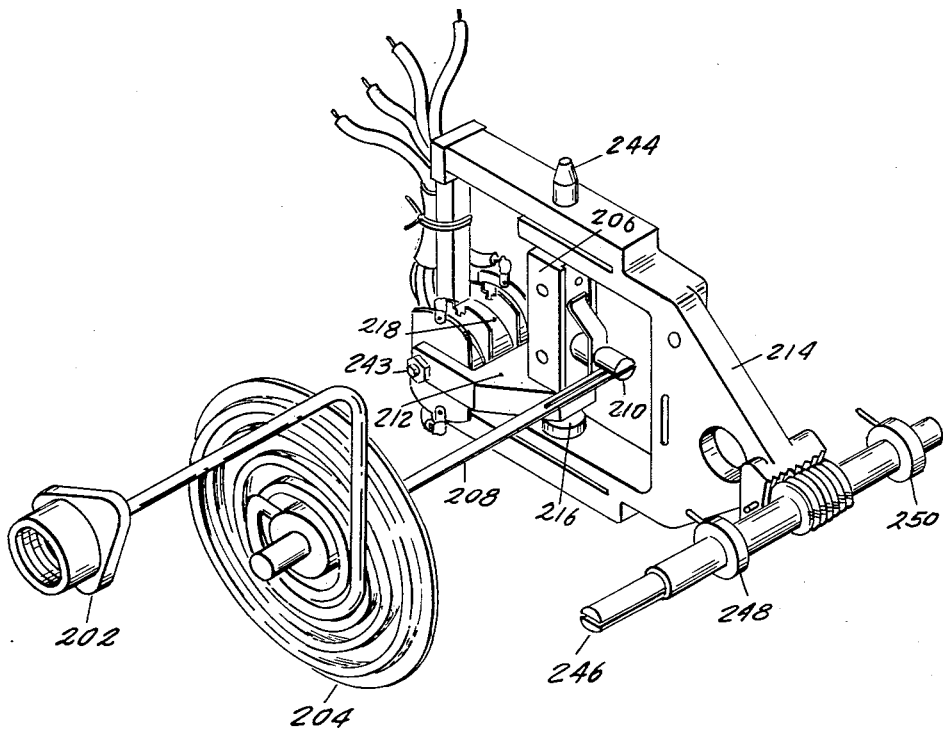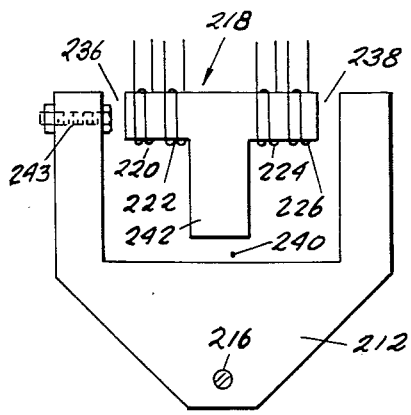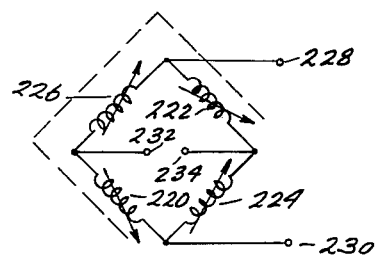

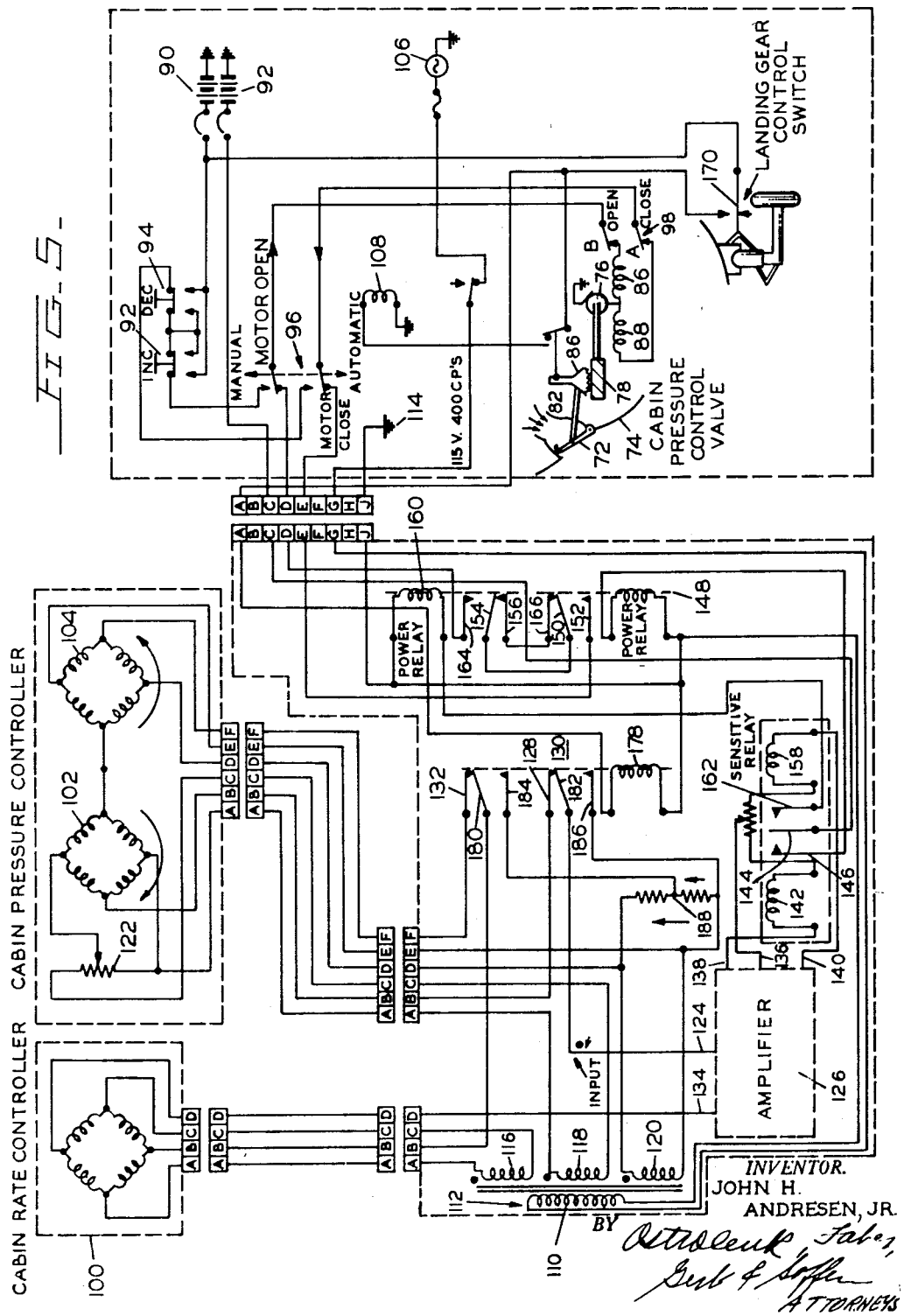

United States Patent Office 2,983,211
Patented May 9, 1961

2,983,211

CABIN PRESSURIZATION—PRESSURE MONITOR SYSTEM

John H. Andresen, Jr., Greenwood Lake, N.Y., assignor to Kollsman Instrument Corporation, Elmhurst, N.Y., a corporation of New York Filed Mar. 19, 1957, Ser. No. 647,116

11 Claims. (Cl. 98—1.5)

This invention relates to an improved cabin pressure system for aircraft using novel sensing devices for measuring the rate of change of cabin pressure, the cabin pressure and the pressure difference between the cabin pressure and altitude pressure.

Cabin pressurization systems are well known and generally comprise a supercharger for bringing air into the cabin and an exhaust valve system for exhausting air from the cabin. In order to maintain predetermined cabin pressure conditions within the cabin, the supercharger or the exhaust valve is controlled as a function of rate of change of cabin pressure, cabin pressure and the differential pressure or the pressure difference between the cabin pressure and the altitude pressure.

It is necessary that the differential pressure be measured and maintained below a predetermined value in order to limit air frame stress due to cabin pressurization to a safe value. The rate of change of cabin pressure must be measured and controlled since if it is too high, passengers will be subjected to uncomfortable and possibly dangerous conditions.

It is old in the art to vary the cabin pressure directly proportionally to the variation in flight altitude and to control the rate of change of cabin pressure (within limits given by a maximum pressure differential).

The principal object of my invention is to maintain an adjustably predetermined cabin pressure within limits given by the differential pressure and to achieve this predetermined cabin pressure at an adjustably determined rate of change of cabin pressure which tapers off to zero as the desired cabin pressure is approached.

Thus, when a pilot purposely changes the cabin pressure altitude because he is going to fly at a new altitude, the new cabin pressure altitude will be approached at a controlled rate of change of cabin pressure.

If, however, the aircraft is flying in rough air and the flight altitude is constantly varying or the rate of compressed air supplied to the cabin is varied, the cabin pressure will not vary and the aircraft passengers will not be subjected to fluctuating cabin pressure.

In the event that the change in altitude is such that a predetermined pressure differential is exceeded, then a pressure differential measuring device will assume control of the system and vary the cabin pressure as required to maintain the differential pressure within its predetermined limit.

As stated above, three pressure transducers or pressure monitoring devices are required in a cabin pressurization system: one for cabin pressure, one for measuring rate of change of cabin pressure and one for measuring differential pressure. These devices comprise diaphragm capsules of well known construction wherein the cabin pressure monitor is directly subjected to the cabin pressure, the rate of change monitor has a controlled leak and is subjected to cabin pressure and the differential monitor is internally subjected to flight altitude pressure and externally subjected to cabin pressure.

In the past, these diaphragm capsules have been connected to actuate a contact structure responsive to their expansion and contraction. Subsequently, these contacts actuate other circuit elements for control of air exhaust or air input to the cabin. These mechanisms, using very light contact pressures for sufficient sensitivity and accuracy, proved relatively unreliable and required excessive maintenance to keep contacts clean.

In my novel system a variation of the relative position of parts of a pressure monitor can alter the magnetic structure of an inductor to thereby alter the inductance thereof or, if desired, the position of a capacitor electrode can be altered to alter the capacitance of the capacitor.

In a preferred embodiment of my novel pressure monitor, which could be used in any pressure measuring application, four inductance coils are connected in bridge relation and are wound on a common magnetic core. The magnetic core is then connected to be moved responsive to a movement of a diaphragm capsule to thereby change the inductance of adjacent inductance coils in the bridge with respect to one another to thereby unbalance the bridge in accordance with the movement of the diaphragm. Hence, the output voltage of the bridge which depends on the bridge unbalance is functionally related to the pressure on the diaphragm.

It is to be noted that while the past devices which actuate contact mechanisms are purely on-off devices, this novel pressure monitor continuously measures the pressure subjected thereto and furthermore is free of all the disadvantages of a contact type mechanism.

When using the above described pressure monitors in this novel cabin pressurization system, the pilot has two controls to set, one for the desired cabin altitude and the rate at which that altitude is to be reached.

The altitude monitor element gives a voltage output indicative of the deviation of the cabin altitude from a preset value which corresponds to a balanced condition of the impedance bridge. Clearly, this preset value can be adjusted by adjusting the point at which the bridge is balanced.

The rate of change of pressure monitor has an output voltage which is proportional to the rate of change of cabin altitude, this output being connected in series with and opposed to the output voltage of the altitude monitor.

The differential pressure monitor element, which could be of any desired type, could also be of the unbalanced bridge type to provide an output signal in series with the other two elements when the cabin differential pressure exceeds a predetermined value. As will be seen hereinafter, the signal due to the differential pressure element will be large enough to assume control of the system so that exhaust valves may be opened to prevent a dangerously high differential pressure.

The two most frequently encountered situations in cabin pressure control are:

(1) Changing from one cabin altitude to another.
(2) Holding a fixed cabin altitude.

When the airplane is airborne, the outputs of the three monitor elements are arranged in series so that when the cabin altitude differs from but is approaching the preset value, the outputs of the rate and altitude monitors are in opposition. As long as the differential pressure remains below its limiting value, the differential pressure monitor does not give a signal. Therefore, when the altitude monitor is producing a signal because the cabin altitude is different from the preset value, a cabin pressure control valve is moved so as to produce enough rate of change of altitude to produce a signal from the rate monitor which is equal and opposite to the altitude signal. When the signals are equal, the valve stops in that position.

The altitude monitor reaches its maximum output for a small difference from the set altitude. For any larger errors in cabin altitude, the voltage remains fixed. The rate of climb in the cabin which the valve must produce is dependent on the value of this fixed voltage. Therefore, the rate of change from one altitude to another is selected by adjusting the excitation voltage and, therefore, the maximum output of the altitude monitor.

When the control system is holding the cabin pressure at a fixed value, the rate and cabin altitude signals combine to give smooth control in a manner similar to that described above.

When the cabin differential pressure reaches its limiting value, the differential pressure monitor element produces an "open valve" signal. The monitor elements are adjusted so that the maximum differential pressure signal will exceed any signal the combined altitude and rate monitors can produce and consequently will override the altitude signal when the maximum differential pressure is exceeded.

Prior to landing an aircraft equipped with this novel system, it is desirable that the cabin pressure be equalized with the external atmospheric pressure. To this end, the landing gear of the aircraft operates to disconnect the altitude monitor element and cause a fixed "open valve" voltage to be switched into the control circuit upon operation of the landing gear. The rate monitor remains in the circuit and causes cabin depressurization at a comfortable rate until the cabin pressure reaches the external pressure.

In view of the foregoing remarks, the main object of this invention is to provide a novel cabin pressurization system using novel pressure monitoring elements.

Another object of this invention is to provide a cabin pressure system whose adjustably desired cabin pressure may be maintained and reached by a predetermined rate of pressure change which decreases to zero when the desired pressure is reached.

Another object of this invention is to utilize pressure monitoring devices having a continuous electrical output for a cabin pressurization system.

Another object of this invention is to provide a cabin pressure monitor device having a voltage output which is proportional to the cabin pressure and connected in opposing relation with the output voltage of a pressure rate of change monitoring device, the net output controlling the cabin pressure.

Another object of this invention is to provide a differential pressure monitoring device in the above noted system which assumes control of the cabin pressure when this pressure exceeds a predetermined value.

A still further object of this invention is to provide a pressure monitor device which varies the relative impedance of parts of an electrical network.

Still another object of this invention is to have a diaphragm capsule vary the inductance of an inductor or capacitance of a capacitor responsive to a change in pressure.

Another object of this invention is to cause the motion of a diaphragm capsule to vary the inductance of adjacent inductors of a bridge connected inductor circuit so as to effect the balance of the bridge and hence effect its output voltage.

Another object of this invention is to connect the output voltages of an altitude measuring device and a rate of pressure change device in opposing relation whereby a fixed desired altitude is adjusted by varying the point at which the bridge of the altitude device is balanced and the maximum rate of change of pressure is adjusted by adjusting the input voltage to the bridge of the altitude device.

These and other objects of this invention will become apparent when taken in conjunction with the drawings in which:

Figure 1 schematically shows this novel pressurization system.

Figure 4 shows a perspective view of the novel pressure monitor of this invention.

Figure 4a shows a top cross-sectional view taken through the armature of Figure 4.

Figure 4b shows a connection diagram from the windings of Figure 4a.

Figure 5 shows a complete circuit diagram of the novel system of this invention.

Figure 1:
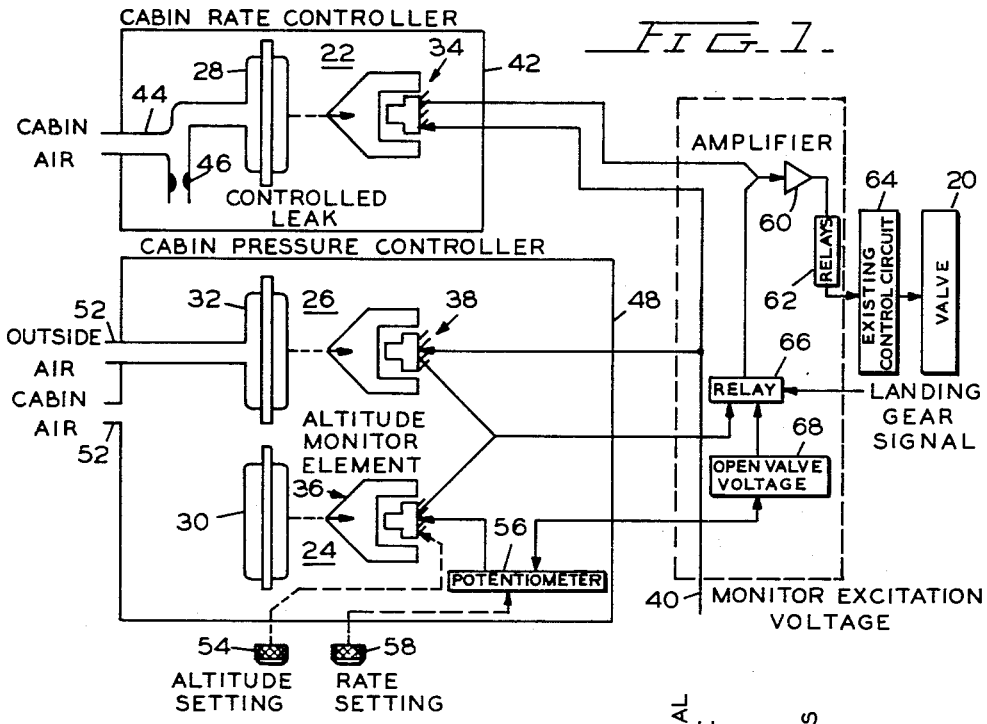

The principle of this novel pressurization system may be schematically seen in Figure 1 wherein valve 20 which could be an exhaust valve of a pressurized cabin is to be controlled in accordance with the pressures measured by rate of change of pressure monitor 22, cabin pressure monitor 24 and differential pressure monitor 26.

Each of the pressure monitors, the construction of which will be described more fully hereinafter, is activated by a diaphragm capsule 28, 30 and 32, respectively, which by controlling an impedance element controls the output of devices 34, 36 and 38, respectively, which are energized from the input line or source of monitor excitation voltage 40.

The rate of cabin pressure change monitor 22 is positioned within a housing or case 42 and the interior of diaphragm 28 is subjected to cabin pressure through line 44. The line 44 is further provided with a controlled leak 46 leading into the case 42. The diaphragm capsule will then, as well known in the art, position its diaphragm in accordance with the rate of change of the cabin pressure. The electrical output of device 34 which is varied by diaphragm capsule 28 is, therefore, a function of the rate of change of cabin pressure.

More specifically, for zero vertical speed, pressures inside and outside diaphragm capsule 28 are the same.

During change in altitude, pressure inside the diaphragm changes immediately, but the case pressure lags behind because of the small orifice or controlled leak 46 and the large case volume. This causes a differential pressure across the diaphragm which is nearly proportional to the vertical speed at all altitudes.

Both the differential pressure monitor 26 and altitude monitor 24 are positioned within box 48, the interior of which is connected to the cabin pressure through line 50 with the interior of diaphragm capsule 30 being evacuated while the interior of diaphragm capsule 32 is connected to the flight altitude pressure through line 52.

Thus, the diaphragm of diaphragm capsule 32 is positioned in accordance with the pressure difference between the cabin air pressure and the flight or external pressure. Since the output of device 38 is controlled by diaphragm capsule 32, the electrical output of device 38 depends on the pressure differential.

Figure 2:
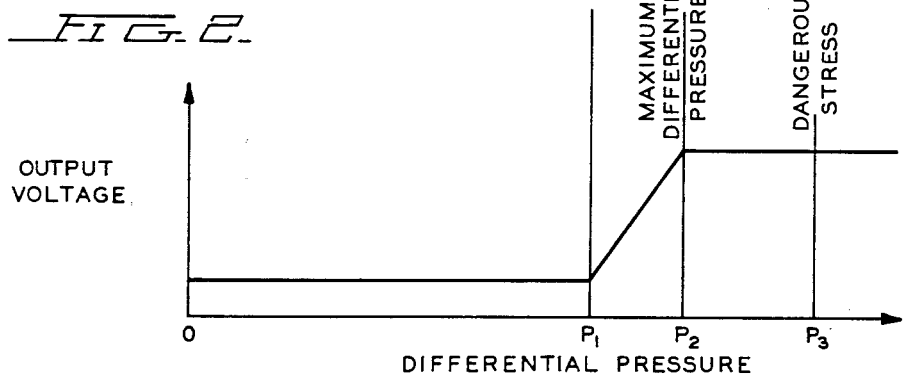
Figure 2 shows a curve of output voltage as a function of differential pressure for the differential pressure monitor.

It is desirable that the output of differential pressure monitor 26 be similar to that shown in Figure 2, this characteristic being relatively easy to obtain with judicious circuit design.

In Figure 2 it is seen that at point $P_1$, when the differential pressure approaches too high a value, a signal is initiated by the differential pressure monitor which will cause the cabin valve to move to relieve this pressure difference. As the differential pressure continues to increase, a correspondingly stronger signal is obtained from the differential pressure monitor until at $P_2$, or the maximum permissible differential below the point $P_3$ at which the air frame will be dangerously stressed, the signal achieves a maximum.

As heretofore mentioned, diaphragm capsule 30 is subjected only to cabin pressure and its diaphragm position will vary accordingly. Hence, the output voltage of device 36 which is varied by diaphragm capsule 30 is a function of cabin pressure.

As will be seen more fully hereinafter, device 36 is of the balanceable type wherein the output depends on the degree of unbalance. In order to adjust the cabin pressure to a predetermined point, a knob 54 is connected to vary the balance point or zero output point of device 36.

The input voltage from line 40 to device 36 is controlled by potentiometer 56 which is controlled by knob 58. As will be presently seen, the adjustment of the input voltage to device 36 by knob 58 determines the maximum rate of change of cabin pressure.

During normal automatic operating conditions, the outputs of altitude monitor 36 and rate of pressure monitor 34 are connected in opposing relaitonship with one another, the net signal being impressed upon amplifier 60. The output voltage of amplifier 60 then controls relays 62 which in turn control operation of control circuits 64 (which could be existing pressure control circuitry) to thereby ultimately control exhaust valve 20.

When changing from one altitude setting to another by varying knob 54, the balance point of device 36 is changed and there is an output voltage from device 36. It is to be noted that device 36 can be constructed so that its output is at a maximum for a small deviation from the preselected pressure. Thus, as seen in Figure 3, at time $t_1$, the cabin altitude is changed from $A_1$ to $A_2$.

Figure 3:
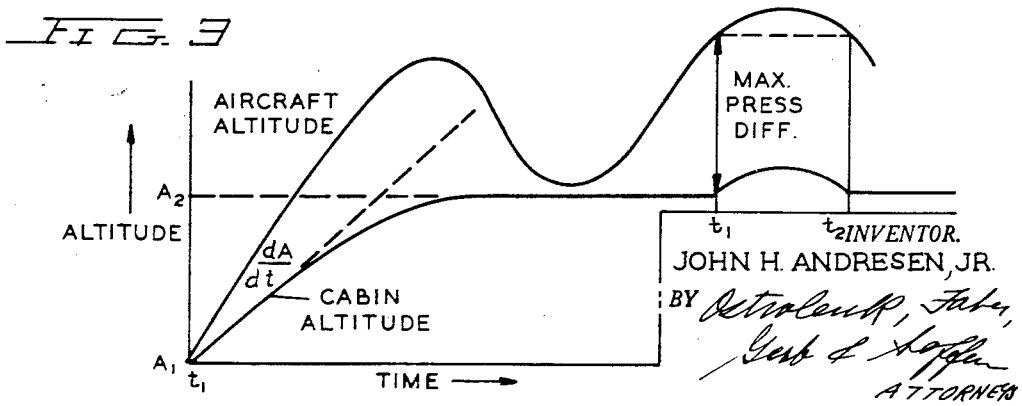
Figure 3 shows a curve of altitude as a function of time for the system of Figure 1.

The output voltage of device 36 is now impressed on amplifier 60 and operates to vary valve 20 which in turn varies the cabin pressure. Because of the change in cabin pressure, there will be a proportional output from device 34 which is equal and opposite to the maximum output signal of device 36, the maximum rate of change of cabin pressure being dependent upon the maximum output voltage of device 36. This, however, depends on the input voltage which is controlled by potentiometer 56 whereby adjustment of potentiometer 56 by knob 58 will adjust the maximum rate of change of pressure or the slope $$\frac{dA}{dt}$$

of Figure 3.

As the cabin pressure approaches its predetermined value, the unbalance of device 36 of Figure 1 will decrease and its output voltage will decrease accordingly. Hence, the position of valve 20 will be altered until the output of device 34 is decreased accordingly.

This operation will then proceed, and as seen in Figure 3, the cabin pressure will slowly approach the new altitude setting $A_2$.

Further reference to Figure 3 shows that the cabin pressure is maintained relatively constant even though the flight altitude varies. Clearly, the cabin pressure is maintained at this constant value by the coordinated operation of devices 34 and 36 in a manner similar to that set forth above.

Figure 1 further shows the output of differential pressure monitor 38 as being connected in series with the outputs of devices 34 and 36. When the differential pressure becomes excessive, the output of device 38 produces an "open valve" voltage large enough to overcome the output voltages of devices 34 and 36.

Upon measuring too large a pressure differential as at time $t_1$ of Figure 3, an "open valve" signal to amplifier 60 activates valve 20 to decrease the pressure differential. At time $t_2$, when the aircraft altitude decreases sufficiently to permit normal automatic operation to proceed, the cabin pressure is returned to the predetermined value $A_2$.

Since it is desirable to equalize cabin pressure and flight pressure prior to landing, relay 66 is operated responsive to operation of the landing gear whereby voltage source 68 is connected to amplifier 60 to operate valve 20 and allow depressurization to proceed at some comfortable rate determined by the open valve voltage source 68.

The construction of the pressure monitors such as monitors 22, 24 and 26 of Figure 1 is set forth in Figures 4 and 4a wherein Figure 4a is a sectional view taken through the armature and field members of the perspective view of Figure 4 for the case of a differential pressure monitor.

Referring first to Figure 4, a pressure fitting 202 feeds one pressure to the inside of the diaphragm 204. A second pressure, which is the pressure inside the case housing the device of Figure 4, acts on the outside of diaphragm 204.

Clearly, in an altitude monitor, diaphragm 204 will be evacuated and the pressure is fed to the inside of the instrument case to act on the outside of diaphragm 204, while in a rate monitor, a diaphragm with a controlled leak is used as was described before, and the pressure is fed to the case.

The diaphragm 204 is attached to the rocking shaft 206 by means of link 208 and calibrating arm 210. If desired, link 208 may be attached to a temperature compensator (not shown) on either the diaphragm centerpiece or the rocking shaft 206.

The rocking shaft 206 is directly connected to armature structure 212 (see Figure 4a) which is pivotally mounted on the yoke 214 at the pivotal mounting structure 216.

Thus as the pressure applied to diaphragm 204 varies, the diaphragm expands or contracts to rotate the rocking shaft 206 and C-shaped armature 212 with respect to the yoke 214.

A field structure 218 is then mounted on the yoke 214 and, as best seen in Figure 4a, comprises a T-shaped magnetic structure nested within the C-shaped armature 212. The two upper legs of the T of field structure 218 then have two windings 220, 222, and 224, 226 respectively wound thereon, as shown in Figure 4a, these windings being connected as shown in Figure 4b to form a bridge circuit having input terminals 228 and 230 and output terminals 232 and 234.

In view of this novel structure, the inductance of coils 220 and 222 may be varied with respect to the inductance of coils 224 and 226 by varying the angular position of armature 212 with respect to the field structure 218 to thereby change the airgaps 236 and 238 of Figure 4a and thus change the reluctance of their respective magnetic circuits.

Thus in one embodiment of this invention, the air gaps 236 and 238 are large with respect to air gap 240 whereby the magnetic circuit of each pair of coils will have a relatively large amount of flux passing through the center leg 242 of field structure 218. When, however, structure 212 is rotated about pivot point 216 with respect to field structure 218, one of the air gaps 236 or 238 will increase while the other decreases whereby the inductance of one pair of coils will decrease and the inductance of the other pair will increase respectively. This rotation can, if desired, be limited by adjustable stops such as adjustable stop 243 of Figures 4 and 4a.

Hence, the bridge circuit of Figure 4b will be unbalanced by a variation of pressure applied to diaphragm 204 to a degree depending on the magnitude of variation of the diaphragm dimensions.

In order to allow initial adjustment of the bridge of Figure 4b, the yoke 214 of Figure 4 is pivotally mounted at pivot 244 which is coaxial with pivot 216 and the yoke is threadably engaged by an adjustable setting shaft 246. The adjustable setting shaft 246 is manually operable and includes the non-jamming stops 248 and 250 which limit its motion. In operation, rotation of shaft 246 will cause an angular displacement between the field structure 218 carried by the yoke, and the armature structure 212 which is maintained in its angular position through the link 208 and rocking shaft 206.

In the rate monitor, the shaft 246 is adjusted at assembly to have the bridge give a null output for zero vertical speed. The voltage output thereafter is due solely to the motion of the diaphragm 204 and the armature 212.

It is to be noted that link 208 is slotted to permit the diaphragm 204 to continue to move after the field structure engages a stop means such as stop means 243 of armature 212. Furthermore, backlash in the mechanism may be taken up by a series of coil springs (not shown), while an adjustable counter weight balances the movable parts.

Figure 5 shows a complete circuit diagram for connecting pressure monitors of the type shown in Figure 4 to a pressure control valve in the manner described in Figure 1.

More specifically, a valve member 72 is positioned to control the air pressure within a pressurized cabin, the external surface of which is fragmentarily shown as surface 74. The position of valve 72 is controlled by reversible motor 76 which is operatively connected to valve 72 through pinion 78, pivotally mounted gear sector 80 and link 82. Motor 76 is connected to ground 84 through either of field windings 86 or 88. Energization of field winding 86 drives the motor to open valve 72, while energization of field winding 88 drives the motor 76 to close valve 72. Each of coils 86 and 88 is energizable from D.-C. source 90 for manual control of cabin pressure or D.-C. source 92 for automatic control of cabin pressure.

Referring first to manual control, the operator will have contact switches 92 and 94 for selectively energizing either of windings 88 or 86, respectively, from the D.-C. source 90. It is to be noted that this energization will occur with switch device 96 in the manual position, this switch being shown in the automatic position in Figure 5.

Switch devices 98 are limit switches which deenergize the field windings when the valve 72 is fully open (98B) or fully closed (98A). This prevents damage to the mechanism when it approaches its fully open or closed mechanical stops.

During automatic operation, however, motor 76 and more specifically its windings 86 and 88 are energized from D.-C. source 92 in accordance with the measured values of pressure monitors 100, 102 and 104 whereby monitor 100 responds to a rate of change of pressure, monitor 102 responds to cabin pressure, and monitor 104 responds to differential pressure, respectively. Clearly, each of the pressure monitors 100, 102 and 104 is of the bridge type described in connection with Figure 4.

The input for the pressure control monitors comes from an A.-C. source 106 seen at the extreme right-hand side of the drawing through the relay contacts of relay device 108, through terminal G, primary winding 110 of transformer 112 and thereafter directly to terminal J and then to ground 114. Secondary windings 116, 118 and 120 of transformer 112 are thereby energized, which windings are, respectively, connected to the inputs of pressure monitors 100, 102 and 104.

It is to be noted that the input of cabin pressure monitor 102 is taken through the rate setting potentiometer 122 so as to allow control of the rate of change of cabin pressure as has been hereinbefore described by an adjustment of the input voltage to the cabin pressure monitor 102.

The outputs of each of cabin pressure monitors 100, 102 and 104 are then seen connected in series, the circuit including input wire 124 of amplifier 126, relay contact 128 of relay device 130, terminal B, the output terminals of the cabin pressure monitor 102, the output terminals of differential pressure monitor 104, terminal F, contact 132 of relay 130, terminal B, the output terminals of pressure rate monitor 100, terminal D and finally input wire 134 of amplifier 126.

Thus, it is seen that each of pressure monitors 100, 102 and 104 has its outputs connected in series into the amplifier 126. Depending on the pressure conditions within the cabin and assuming that the pressure differential is within its predetermined limits, the amplifier output will be between the lines 136 and 138 when the cabin pressure is to be increased and between lines 136 and 140 when the pressure is to be decreased. When the pressure is to be maintained constant, of course, there will be a zero output in the amplifier 126. When the output, however, is between lines 136 and 138, relay coil 142 will be energized so as to bring the movable relay contact 144 into engagement with stationary relay contact 146 to thereby connect D.-C. voltage source 92 to power relay coil 148, thus moving the movable contact 150 into engagement with stationary contact 152.

This in turn will complete the circuit from D.-C. source 92 through terminal C, movable contact 154, stationary contact 156, movable contact 105, stationary contact 152, terminal E, switch device 96, contact device 98, field winding 88 of motor 76 and ground 84.

Hence, when the pressure monitors 100, 102 and 104 require an increased pressure in the cabin, motor 76 will be energized to close valve 72 and thereby achieve this desired increase.

In the event that the pressure monitors call for a decrease of pressure within the cabin being controlled, the output of amplifier 126 will be across lines 136 and 140 to energize the coil 158 which operates responsive to various small coils and allows connection of D.-C. source 92 to power relay winding 160 through the circuit including D.-C. source 92, terminal C, through the contact 144, stationary contact 162, power relay 160, terminal J and ground 114.

Responsive to the energization of power relay coil 160, movable contact 154 will be moved into engagement with the stationary contact 164 to thereby complete a circuit from D.-C. source 92, terminal C, stationary contact 166, movable contact 150, movable contact 154, stationary contact 164, terminal D, contact device 96, contact device 98, field winding 86 of motor 76 and finally ground 84.

Energization of coil 86 then causes motor 76 to open valve 72 to thereby achieve the required decrease in cabin pressurization.

It is to be noted that so long as the output of amplifier 126 is zero, movable contact 144 of the sensitive relay will be in a disconnected position and movable contacts 150 and 154 of the power relay will be in the positions shown in the drawing. Hence, the D.-C. source 92 will be disconnected from windings 86 or 88 of the motor 76, and the valve 72 will remain in a fixed position.

In the event of a danger of exceeding a predetermined pressure differential, the pressure monitor 100 will, as is set forth hereinbefore, assume a high output voltage which could be substantially equal to the voltage of secondary winding 116. This voltage is high enough to overcome whatever voltages appear on monitor elements 102 and 104 and will thereby assume control of amplifier 126 to cause the valve 72 to run toward open in a manner set forth above.

In order to achieve pressure equalization of the cabin pressure and the external flight pressure when the aircraft is being landed, a contact device is operable responsive to operation of the aircraft landing gear. Operation of this switch connects D.-C. source 90 through terminal A to the relay 178. Energization of relay winding 178, however, will move movable contacts 180 and 182 into engagement with stationary contacts 184 and 186, respectively, so as to connect the open valve voltage across resistor means 188 in series with the output of rate monitor element 100 to the amplifier 126. This voltage in turn will cause operation of valve 72 at a predetermined controlled rate to equalize the internal cabin pressure with the external pressure.

Although I have described preferred embodiments of my novel invention, many variations and modifications will now be obvious to those skilled in the art, and I prefer, therefore, to be limited not by the specific disclosure herein but only by the appended claims.

I claim:

1. In a cabin pressurization system for aircraft having means for bringing air into a pressurized cabin, valve means for exhausting air from said pressurized cabin, and electrically energizable valve control means operatively connected to said valve for controllably positioning said valve to control the air flow exhausted therethrough; a pressure measuring system for energizing said valve control means comprising a first transducer means for continuously measuring the rate of change of cabin pressure and a second transducer means for continuously measuring the cabin pressure; said first and second transducer means being constructed to produce output voltages related to their respective pressure measurements; said first and second transducer output voltages and said valve control means being connected in series with one another, said first and second transducer output voltages being opposed to one another; said valve control means moving said valve toward a closed position when the differences between said first and second transducer output voltages is beyond a predetermined value and to a more open position when said voltage difference is below said predetermined value.

2. In a cabin pressurization system for aircraft having means for bringing air into a pressurized cabin, valve means for exhausting air from said pressurized cabin, and electrically energizable valve control means operatively connected to said valve for controllably positioning said valve to control the air flow exhausted therethrough; a pressure measuring system for energizing said valve control means comprising a first transducer means for continuously measuring the rate of change of cabin pressure and a second transducer means for continuously measuring the cabin pressure; said first and second transducer means being constructed to produce output voltages related to their respective pressure measurements; said first and second transducer output voltages and said valve control means being connected in series with one another, said first and second transducer output voltages being opposed to one another; said valve control means moving said valve toward a closed position when the differences between said first and second transducer output voltages is beyond a predetermined value and to a more open position when said voltage difference is below said predetermined value; said second transducer means for measuring cabin pressure having a maximum output voltage for determining the maximum rate of change of cabin pressure.

3. In a cabin pressurization system for aircraft having means for bringing air into a pressurized cabin, valve means for exhausting air from said pressurized cabin, and electrically energizable valve control means operatively connected to said valve for controllably positioning said valve to control the air flow exhausted therethrough; a pressure measuring system for energizing said valve control means comprising a first transducer means for continuously measuring the rate of change of cabin pressure and a second transducer means for continuously measuring the cabin pressure; said first and second transducer means being constructed to produce output voltages related to their respective pressure measurements; said first and second transducer output voltages and said valve control means being connected in series with one another, said first and second transducer output voltages being opposed to one another; said valve control means moving said valve toward a closed position when the differences between said first and second transducer output voltages is beyond a predetermined value and to a more open position when said voltage difference is below said predetermined value; said second transducer means for measuring cabin pressure having a maximum output voltage for determining the maximum rate of change of cabin pressure; and means for adjusting said maximum output voltage of said second transducer means for adjusting the maximum rate of change of cabin pressure.

4. In a cabin pressurization system for aircraft having means for bringing air into a pressurized cabin, valve means for exhausting air from said pressurized cabin, and electrically energizable valve control means operatively connected to said valve for controllably positioning said valve to control the air flow exhausted therethrough; a pressure measuring system for energizing said valve control means comprising a first transducer means for continuously measuring the rate of change of cabin pressure and a second transducer means for continuously measuring the cabin pressure; said first and second transducer means being constructed to produce output voltages related to their respective pressure measurements; said first and second transducer output voltages and said valve control means being connected in series with one another, said first and second transducer output voltages being opposed to one another; said valve control means moving said valve toward a closed position when the differences between said first and second transducer output voltages is positive and to a more open position when said voltage difference is negative.

5. In a cabin pressurization system for aircraft having means for bringing air into a pressurized cabin, valve means for exhausting air from said pressurized cabin, and electrically energizable valve control means operatively connected to said valve for controllably positioning said valve to control the air flow exhausted therethrough; a pressure measuring system for energizing said valve control means comprising a first transducer means for continuously measuring the rate of change of cabin pressure and a second transducer means for continuously measuring the cabin pressure; said first and second transducer means being constructed to produce output voltages related to their respective pressure measurements; said first and second transducer output voltages and said valve control means being connected in series with one another, said first and second transducer output voltages being opposed to one another; said valve control means moving said valve toward a closed position when the differences between said first and second transducer output voltages is positive and to a more open position when said voltage difference is negative; said cabin pressure being normally maintained at a value yielding a zero output voltage for said second transducer means, said normal cabin pressure level being adjusted by adjusting said transducer zero voltage output point.

6. In a cabin pressurization system for aircraft having means for bringing air into a pressurized cabin, valve means for exhausting air from said pressurized cabin, and electrically energizable valve control means operatively connected to said valve for controllably positioning said valve to control the air flow exhausted therethrough; a pressure measuring system for energizing said valve control means comprising a first transducer means for continuously measuring the rate of change of cabin pressure and a second transducer means for continuously measuring the cabin pressure; said first and second transducer means being constructed to produce output voltages related to their respective pressure measurements; said first and second transducer output voltages and said valve control means being connected in series with one another, said first and second transducer output voltages being opposed to one another; said valve control means moving said valve toward a closed position when the differences between said first and second transducer output voltages is positive and to a more open position when said voltage difference is negative; said cabin pressure being normally maintained at a value yielding a zero output voltage for said second transducer means, said normal cabin pressure level being adjusted by adjusting said transducer zero voltage output point; said second transducer means for measuring cabin pressure having a maximum output voltage for determining the maximum rate of change of cabin pressure.

7. In a cabin pressurization system for aircraft having means for bringing air into a pressurized cabin, valve means for exhausting air from said pressurized cabin, and electrically energizable valve control means operatively connected to said valve for controllably positioning said valve to control the air flow exhausted therethrough; a pressure measuring system for energizing said valve control means comprising a first transducer means for continuously measuring the rate of change of cabin pressure and a second transducer means for continuously measuring the cabin pressure; said first and second transducer means being constructed to produce output voltages related to their respective pressure measurements; said first and second transducer output voltages and said valve control means being connected in series with one another, said first and second transducer output voltages being opposed to one another; said valve control means moving said valve toward a closed position when the differences between said first and second transducer output voltages is positive and to a more open position when said voltage difference is negative; said cabin pressure being normally maintained at a value yielding a zero output voltage for said second transducer means, said normal cabin pressure level being adjusted by adjusting said transducer zero voltage output point; said second transducer means for measuring cabin pressure having a maximum output voltage for determining the maximum rate of change of cabin pressure; a change in cabin pressure from a first normal value to a second normal value due to a change in said zero voltage output point of said second transducer means being achieved by a rate of change of cabin pressure having its maximum value limited by said maximum output voltage of said second transducer and tapering off to zero as said second normal value of cabin pressure is approached.

8. A valve control system for controlling a pressure control valve comprising electrically energizable valve control means operatively connected to said valve for controllably positioning said valve; a pressure measuring system for energizing said valve control means comprising a first transducer means for continuously measuring the rate of change of cabin pressure and a second transducer means for continuously measuring the cabin pressure; and a third transducer means for measuring the pressure differential between the external pressure and the pressure within said cabin; said first, second and third transducer means being constructed to produce output voltages related to their respective pressure measurements; said first, second and third transducer output voltages being connected in series with one another, said first and second transducer output voltages being opposed to one another; said valve control means moving said valve toward a more closed position when the difference between said first and second transducer output voltages is of a first polarity and toward a more open position when said voltage difference is of a second polarity; said third transducer imposing an overriding voltage on said first and second transducer output voltages of said second polarity to move said valve toward said more open position when the pressure differential is beyond a predetermined value.

9. A valve control system for controlling a pressure control valve comprising electrically energizable valve control means operatively connected to said valve for controllably positioning said valve; a pressure measuring system for energizing said valve control means comprising a first transducer means for continuously measuring the rate of change of cabin pressure and a second transducer means for continuously measuring the cabin pressure; and a third transducer means for measuring the pressure differential between the external pressure and the pressure within said cabin; said first, second and third transducer means being constructed to produce output voltages related to their respective pressure measurements; said first, second and third transducer output voltages being connected in series with one another, said first and second transducer output voltages being opposed to one another; said valve control means moving said valve toward a more closed position when the difference between said first and second transducer output voltages is of a first polarity and toward a more open position when said voltage difference is of a second polarity; said third transducer imposing an overriding voltage on said first and second transducer output voltages of said second polarity to move said valve toward said more open position when the pressure differential is beyond a predetermined value; said second transducer means for measuring cabin pressure having a maximum output voltage for determining the maximum rate of change of cabin pressure; and means for adjusting said maximum output voltage of said second transducer means for adjusting the maximum rate of change of cabin pressure.

10. A valve control system for controlling a pressure control valve comprising electrically energizable valve control means operatively connected to said valve for controllably positioning said valve; a pressure measuring system for energizing said valve control means comprising a first transducer means for continuously measuring the rate of change of cabin pressure and a second transducer means for continuously measuring the cabin pressure; and a third transducer means for measuring the pressure differential between the external pressure and the pressure within said cabin; said first, second and third transducer means being constructed to produce output voltages related to their respective pressure measurements; said first, second and third transducer output voltages being connected in series with one another, said first and second transducer output voltages being opposed to one another; said valve control means moving said valve toward a more closed position when the difference between said first and second transducer output voltages is of a first polarity and toward a more open position when said voltage difference is of a second polarity; said third transducer imposing an overriding voltage on said first and second transducer output voltages of said second polarity to move said valve toward said more open position when the pressure differential is beyond a predetermined value; said second transducer means for measuring cabin pressure having a maximum output voltage for determining the maximum rate of change of cabin pressure; and means for adjusting said maximum output voltage of said second transducer means for adjusting the maximum rate of change of cabin pressure; said cabin pressure being normally maintained at a value yielding a zero output voltage for said second transducer means, said normal cabin pressure level being adjusted by adjusting said transducer zero voltage output point.

11. A valve control system for controlling a pressure control valve comprising electrically energizable valve control means operatively connected to said valve for controllably positioning said valve; a pressure measuring system for energizing said valve control means comprising a first transducer means for continuously measuring the rate of change of cabin pressure and a second transducer means for continuously measuring the cabin pressure; and a third transducer means for measuring the pressure differential between the external pressure and the pressure within said cabin; said first, second and third transducer means being constructed to produce output voltages related to their respective pressure measurements; said first, second and third transducer output voltages being connected in series with one another, said first and second transducer output voltages being opposed to one another; said valve control means moving said valve toward a more closed position when the difference between said first and second transducer output voltages is of a first polarity and toward a more open position when said voltage difference is of a second polarity; said third transducer imposing an overriding voltage on said first and second transducer output voltages of said second polarity to move said valve toward said more open position when the pressure differential is beyond a predetermined value; said second transducer means for measuring cabin pressure having a maximum output voltage for determining the maximum rate of change of cabin pressure; and means for adjusting said maximum output voltage of said second transducer means for adjusting the maximum rate of change of cabin pressure; said cabin pressure being normally maintained at a value yielding a zero output voltage for said second transducer means, said normal cabin pressure level being adjusted by adjusting said transducer zero voltage output point; a change in cabin pressure from a first normal value to a second normal value due to a change in said zero voltage output point of said second transducer means being achieved by a rate of change of cabin pressure having its maximum value limited by said maximum output voltage of said second transducer and tapering off to zero as said second normal value of cabin pressure is approached.

References Cited in the file of this patent

UNITED STATES PATENTS

| | | |
|---|---|---|
| 2,585,295 | Baak | Feb. 12, 1952 |
| 2,589,597 | Baak | Mar. 18, 1952 |
| 2,612,828 | Del Mar | Oct. 7, 1952 |
| 2,660,942 | Del Mar | Dec. 1, 1953 |